United States Patent
Raza

(10) Patent No.: US 7,630,392 B2
(45) Date of Patent: Dec. 8, 2009

(54) MULTI-HOMING USING CONTROLLED ROUTE LEAKAGE AT A BACKUP SERVICE PROVIDER

(75) Inventor: Syed Khalid Raza, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 709 days.

(21) Appl. No.: 11/141,183

(22) Filed: May 31, 2005

(65) Prior Publication Data

US 2006/0268681 A1 Nov. 30, 2006

(51) Int. Cl.
*H04J 3/26* (2006.01)
*H04H 20/71* (2008.01)

(52) U.S. Cl. ...................... 370/432; 370/312

(58) Field of Classification Search ............... 370/254, 370/389, 392, 395.2, 401, 312, 216, 400, 370/431–432; 706/3; 709/228, 245
See application file for complete search history.

(56) References Cited

U.S. PATENT DOCUMENTS

| | | | |
|---|---|---|---|
| 5,917,820 A | | 6/1999 | Rekhter |
| 6,339,595 B1 * | | 1/2002 | Rekhter et al. ............... 370/392 |
| 6,526,056 B1 * | | 2/2003 | Rekhter et al. ............... 370/392 |
| 6,549,516 B1 * | | 4/2003 | Albert et al. ................ 370/236 |
| 6,771,648 B1 * | | 8/2004 | Kim et al. ................. 370/395.2 |
| 6,839,348 B2 * | | 1/2005 | Tang et al. .................... 370/390 |
| 6,839,829 B1 | | 1/2005 | Daruwalla et al. |
| 6,889,278 B1 | | 5/2005 | Hoerler et al. |
| 6,912,222 B1 * | | 6/2005 | Wheeler et al. ......... 370/395.31 |
| 7,010,607 B1 * | | 3/2006 | Bunton ....................... 709/228 |
| 7,035,202 B2 * | | 4/2006 | Callon ........................ 370/216 |
| 7,120,934 B2 * | | 10/2006 | Ishikawa ...................... 726/23 |
| 7,286,479 B2 * | | 10/2007 | Bragg ........................ 370/238 |
| 7,362,752 B1 * | | 4/2008 | Kastenholz ................. 370/389 |
| 7,561,588 B2 * | | 7/2009 | Ward et al. .................. 370/401 |
| 2002/0075813 A1 * | | 6/2002 | Baldonado et al. .......... 370/254 |
| 2002/0184393 A1 * | | 12/2002 | Leddy et al. ................ 709/250 |
| 2003/0048782 A1 * | | 3/2003 | Rogers et al. ............... 370/389 |
| 2003/0086422 A1 * | | 5/2003 | Klinker et al. .............. 370/389 |
| 2003/0088529 A1 * | | 5/2003 | Klinker et al. ................. 706/3 |

(Continued)

OTHER PUBLICATIONS

Radia Perlman, "Interconnections Second Edition: Bridges, Routers, Switches, and Internetworking Protocols," Chapter 9, pp. 189-220, 2000.

(Continued)

*Primary Examiner*—Kwang B Yao
*Assistant Examiner*—Candal Elpenord
(74) *Attorney, Agent, or Firm*—Cesari and McKenna LLP

(57) ABSTRACT

A technique for implementing route aggregation in a computer network containing a multi-homed customer site connected to primary and second networks, which in turn are both connected to a common "backbone" network. According to the technique, the primary network allocates a block of network addresses for the customer site, and the customer site notifies the secondary network of its allocated addresses. The secondary network first determines whether the primary network has already advertised an aggregated route which incorporates the customer site's route. If so, the secondary network "suppresses" (i.e., does not advertise) the customer site's route. The secondary network only "unsuppresses" the customer site's route if it detects that the primary network has lost connectivity to the customer site and/or the backbone network.

21 Claims, 10 Drawing Sheets

U.S. PATENT DOCUMENTS

| | | | |
|---|---|---|---|
| 2003/0137974 A1* | 7/2003 | Kwan et al. | 370/352 |
| 2003/0154307 A1* | 8/2003 | Puthiyandyil et al. | 709/245 |
| 2003/0169689 A1* | 9/2003 | Chavali | 370/230.1 |
| 2004/0008700 A1* | 1/2004 | Visser et al. | 370/401 |
| 2004/0249971 A1* | 12/2004 | Klinker | 709/239 |
| 2005/0010653 A1* | 1/2005 | McCanne | 709/219 |
| 2005/0025069 A1* | 2/2005 | Aysan | 370/254 |
| 2006/0184692 A1* | 8/2006 | Ikeda | 709/245 |

OTHER PUBLICATIONS

Stephen A. Thomas "IP Switching and Routing Essentials," Chapter 6, pp. 181-219, 2002.

S. Sangli et al. "BGP Extended Communities Attribute," Internet Draft draft-ietf-idr-bgp-ext-communities-07. txt, Sep. 2004..

R. Chandra et al., "BGP Communities Attribute," Request for Comments 1997, Aug. 1996.

E. Chen et al., "An Application of the BGP Community Attribute in Multi-home Routing," Request for Comments 1998, Aug. 1996.

R. Chandra et al., "Capabilities Advertisement with BGP-4," Request for Comments 3392, Nov. 2002.

S. Sangli et al., "BGP Extended Communities Attribute," Internet Draft draft-ietf-idr-bgp-ext-communities-08. txt, available at http://www.ietf.org/internet-drafts/draft-ietf-idr-bgp-ext-communities-08.txt, Aug. 2005.

Y. Rekhter et al., "A Border Gateway Protocol 4 (BGP-4)," Request for Comments 1771, Mar. 1995.

* cited by examiner

| PREFIX 510 | DYNAMIC CONDITIONAL ADVERTISEMENT COMMUNITY ATTRIBUTE 520 | COMMUNITY ATTRIBUTE 530 | OTHER PATH ATTRIBUTES 540 |
|---|---|---|---|
| 10.1.0.0/16 | -- | -- | |
| 10.1.1.0/24 | 10.1.0.0/16 | NO_EXPORT | |
| ... | ... | ... | |

BGP TABLE 500

MULTI-HOMING USING CONTROLLED ROUTE LEAKAGE AT A BACKUP SERVICE PROVIDER

FIELD OF THE INVENTION

This invention relates generally to computer networks, and, more specifically, to a technique for implementing route aggregation in a multi-homed computer network.

BACKGROUND OF THE INVENTION

Networks and Subnetworks

A computer network is a geographically distributed collection of interconnected subnetworks, such as local area networks (LAN), that transport data between network nodes. As used herein, a network node is any device adapted to send and/or receive data in the computer network. The network topology is defined by an arrangement of network nodes that communicate with one another, typically through one or more intermediate network nodes, such as routers and switches. In addition to intra-network communications between nodes located in the same network, data also may be exchanged between nodes located in different networks. To that end, a "border router" located at the logical outer-bound (or "edge") of a first computer network may be adapted to send and receive data with a border router situated at the edge of a neighboring (i.e., adjacent) network. Inter-network and intra-network communications are typically effected by exchanging discrete packets of data according to predefined protocols. In this context, a protocol consists of a set of rules defining how network nodes interact with each other.

A data packet may originate at a source node and subsequently "hop" from node to node along a logical data path until it reaches its destination. The network addresses defining the logical data path of a data flow are most often stored as Internet Protocol (IP) addresses in the packet's internetwork (layer 3) header. IP addresses are typically formatted in accordance with the IP Version 4 (IPv4) protocol, in which network nodes are addressed using 32 bit (four byte) values. The IPv4 addresses are typically denoted by four numbers between 0 and 255, each number delineated by a "dot." Although IPv4 is prevalent in most networks today, IP Version 6 (IPv6) has been introduced to increase the length of an IP address to 128 bits (16 bytes), thereby increasing the number of available IP addresses. For purposes of discussion, IP addresses will be represented as IPv4 addresses hereinafter, although those skilled in the art will appreciate that IPv6 or other layer-3 address formats alternatively may be used in the illustrative embodiments described herein.

A subnetwork may be assigned to an IP address space containing a predetermined range of IPv4 addresses. For example, an exemplary subnetwork may be allocated the address space 128.0.10.*, where the asterisk is a wildcard that can differentiate up to 254 individual nodes in the subnetwork (0 and 255 are reserved values). In this case, a first node in the subnetwork may be assigned to the IP address 128.0.10.1, whereas a second node may be assigned to the IP address 128.0.10.2. The subnetwork is often associated with a subnet mask that may be used to select a set of contiguous high-order bits from IP addresses within the subnetwork's allotted address space. A subnet mask length indicates the number of contiguous high-order bits selected by the subnet mask, and a subnet mask length of N bits is hereinafter represented as /N. The subnet mask length for a given subnetwork is typically selected based on the number of bits required to distinctly address nodes in that subnetwork. Subnet masks and their uses are more generally described in Chapter 9 of the reference book entitled *Interconnections Second Edition*, by Radia Perlman, published January 2000, which is hereby incorporated by reference as though fully set forth herein.

As used herein, an "address prefix" is defined as the result of applying a subnet mask to a network address. An address prefix therefore specifies a range of network addresses in a subnetwork, and a /32 address prefix corresponds to a particular network address. For example, consider the address prefix 10.1.1.4 /30. The first 30 bits of this prefix uniquely identifies the subnetwork 10.1.1.4, and the remaining two least-significant bits of the prefix may be used to differentiate up to four different network nodes in the subnetwork. Accordingly, the prefix 10.1.1.4 /30 includes the IP addresses 10.1.1.4, 10.1.1.5, 10.1.1.6 and 10.1.1.7. A "route" is defined herein as an address prefix and its associated path attributes. A path attribute is generally any property or characteristic that may be associated with the prefix, e.g., such as a cost metric, bandwidth constraint, next-hop identifier and so forth.

Two or more routes may be aggregated if (1) they are associated with a common set of path attributes and (2) their prefixes correspond to contiguous ranges of network addresses or one of the prefix's range of addresses is a superset of the other prefixes'. For example, assume that the routes 128.52.10.0 /24 and 128.52.10.5 /30 are associated with the same path attributes. Since the route 128.52.10.0 /24 includes every IP address within the route 128.52.10.5 /30, the two routes may be aggregated as 128.52.10.0 /24. By way of further example, the routes 128.52.10.0 /25 and 128.52.10.128 /25 respectively specify the contiguous ranges of IP addresses 128.52.10.0-127 and 128.52.10.128-255. Accordingly, these two routes may be aggregated as 128.52.10.0 /24, which contains both routes' IP address ranges.

Border Gateway Protocol

Border routers located at the logical edge of a network or subnetwork may be configured to exchange data with border routers in adjacent networks or subnetworks. The border routers typically execute inter-domain routing protocols (or "exterior" gateway routing protocols) to exchange routing and reachability information across network boundaries. An example of a common inter-domain routing protocol is the Border Gateway Protocol (BGP). The BGP protocol is well known and described in detail in Request For Comments (RFC) 1771 by Y. Rekhter and T. Li, entitled *A Border Gateway Protocol 4 (BGP-4)*, dated March 1995, which is hereby incorporated by reference as though fully set forth herein. A variation of the BGP protocol, known as internal BGP (iBGP), is often used to distribute routing and reachability information between border routers located within the same network or subnetwork. To implement iBGP, the border routers must be "fully meshed," such that each border router is coupled to every other border router, e.g., by way of a Transmission Control Protocol (TCP) connection.

BGP-enabled border routers perform various routing functions, including transmitting and receiving BGP messages and rendering routing decisions based on BGP routing policies. Each border router maintains a local BGP routing table that lists feasible routes to reachable (i.e., accessible) network nodes and subnetworks. Periodic refreshing of the BGP routing table is generally not performed. However, the BGP-enabled border routers do exchange routing information under certain circumstances. For example, when a BGP router initially connects to the network, the router receives the entire contents of the BGP routing tables of its peers, i.e., its adjacent border routers. Thereafter, when the contents of a border router's BGP table changes, the router transmits only the changed portions of its BGP table to its peers which, in turn, update their local BGP tables. A BGP update message is thus an incremental update message sent in response to changes to the contents of the BGP routing table. Routing updates provided by the BGP update messages allow a set of interconnected border routers to construct a consistent view of the network topology. BGP update messages are typically sent using a reliable transport protocol, such as TCP, to ensure their reliable delivery.

Each BGP update message includes network layer reachability information (NLRI) that specifies a list of address prefixes whose reachability information has changed. The BGP update message also may include one or more BGP attributes that are associated with the NLRI address prefixes. For instance, the update message may include a "Next Hop" attribute to indicate which border router should be used as the next hop to reach the address prefixes listed in the NLRI. Conventional BGP attributes and their formats are generally well known and are described in more detail in Chapter 6 of the reference book entitled *IP Switching and Routing Essentials*, by Stephen A. Thomas, published 2002 which is hereby incorporated by reference in its entirety. Together, the NLRI prefixes and their associated BGP attributes comprise a set of BGP routes whose reachability information has changed.

BGP update messages may include one or more BGP community attributes or extended community attributes. As defined in RFC 1997, entitled *BGP Communities Attribute*, by R. Chandra et al., published August 1996, which is hereby incorporated by reference in its entirety, a BGP community is a group of destinations which share a common property. By default, all routes belong to an Internet community. In addition, RFC 1997 also defines other types of BGP communities, such as the "no_export" and "no_advertise" communities. The no_export community identifies a set of routes that may be advertised only within a single network or subnetwork and are not permitted to be advertised outside of that network or subnetwork. The no_advertise community is associated with routes that should not be advertised at all.

BGP extended community attributes provide added flexibility over existing BGP community attributes. In particular, BGP extended communities typically include a "type" field that may be used to differentiate additional types of BGP communities beyond those already supported by the conventional BGP community attribute. The "IPv4-address-specific" extended community attribute is one example of a BGP extended community attribute. Specifically, the IPv4-address-specific extended community attribute comprises a type field, a subtype field, a global administrator field and a local administrator field, as described in more detail in the Internet Engineering Task Force (IETF) publication "draft-ietf-idr-bgp-ext-communities-07.txt," entitled *BGP Extended Communities Attribute*, by Sangli et al., published September 2004, which is hereby incorporated by reference as though fully set forth herein.

Route Aggregation in Multi-Homed Networks

As used herein, a "multi-homed" network is any network or subnetwork that is directly connected to more than one adjacent network or subnetwork. For instance, a customer site (network) may be multi-homed to primary and secondary Internet service providers (ISP). Both the primary and secondary ISPs provide access to an Internet "backbone," i.e., a high-bandwidth, wide-area network that is configured to transport data between remote networks and subnetworks. In this arrangement, the primary ISP functions as the preferred service provider for the customer site, and the secondary ISP functions as a backup service provider. That is, incoming and outgoing network traffic between the customer site and the Internet backbone is preferably routed through the primary ISP. The secondary ISP provides the customer site with access to the Internet backbone in the event that the primary ISP fails, e.g., due to the primary ISP losing connectivity with the Internet backbone and/or the customer site. In response to such a failure, the secondary ISP then becomes the customer site's preferred path for incoming and outgoing network traffic.

FIG. 1 illustrates an exemplary multi-homed computer network 100 in which route aggregation may be employed. The network 100 includes a backbone network 110 that is coupled to both a primary ISP 120 and a secondary ISP 130, which in turn are both coupled to a multi-homed customer site 140. The primary ISP also may be coupled to other customers sites, such as customer sites 150 and 160. The primary ISP may allocate a block of IP addresses for each of its neighboring customer sites. As shown, the primary ISP allocates IP addresses in the range 10.1.1.0 /24 to the customer site 140, 10.1.2.0 /24 to the customer site 150 and 10.1.3.0 /24 to the customer site 160.

Although the primary ISP allocates different IP address ranges for each of its neighboring customer sites, the primary ISP may aggregate these allocated IP address ranges as a single aggregated prefix. For instance, in this example, the primary ISP aggregates the "more specific" (i.e., having longer subnet mask lengths) IP address ranges 10.1.1.0 /24, 10.1.2.0 /24 and 10.1.3.0 /24 as a single aggregated prefix 10.1.0.0 /16. By aggregating the prefixes in this manner, the primary ISP may advertise a single aggregated route to the backbone network 110, rather than advertising a separate route for each customer site 140-160. In this way, the primary ISP notifies network nodes in the backbone network that any IP address in the aggregated range 10.1.0.0/16 can be reached through the primary ISP. Accordingly, the primary ISP advertises fewer routes to the backbone network 110, thereby reducing the number of routes that network nodes in the backbone network have to store in their BGP tables. As a result, the network nodes in the backbone network can search fewer BGP routes in their table and thus perform faster packet-forwarding operations.

After the multi-homed customer site 140 receives its allocated block of IP addresses from the primary ISP 120, the customer site advertises its allocated IP addresses to the secondary ISP 130. For instance, the customer site 140 may send the secondary ISP a BGP update message containing the customer's allocated prefix 10.1.1.0 /24. In response to receiving the customer's allocated IP address range, the secondary ISP typically advertises the customer's route to the backbone network 110. In this way, the secondary ISP notifies network nodes in the backbone network that IP addresses in the customer's allocated range of IP addresses may be reached through the secondary ISP.

Problems often arise in this conventional multi-homed topology. Specifically, at least some BGP-enabled border routers in the backbone network 110 may receive both the aggregated route advertised by the primary ISP and the multi-homed customer site's specific route advertised by the secondary ISP. Because border routers conventionally employ longest prefix-matching algorithms to select the "best paths" for routing network traffic, the border routers will direct the customer site's inbound network traffic through the secondary ISP 130 rather than through the customer's preferred primary ISP 120. In other words, network traffic addressed to a destination IP address in the range of 10.1.1.0 /24 will "match" the more-specific route advertised by the secondary ISP instead of the less-specific aggregated route advertised by the primary ISP. Consequently, the primary ISP's intended route aggregation is "broken." That is, network nodes in the backbone network may have to store more than one BGP table entry for IP address ranges within the aggregated route 10.1.0.0/16, i.e., they may store a first BGP table entry for the aggregated route and a second table entry for the more-specific route 10.1.1.0/24 within the aggregated route. In addition, although the multi-homed customer site 140 can forward its outgoing traffic through the primary ISP 120, as intended, its incoming network traffic will be routed through the secondary ISP 130 due to the conventional longest prefix-matching algorithms in the backbone network 110. This results in an undesired asymmetric network traffic pattern at the customer site 140.

One solution to the above-noted problems has been implemented at the multi-homed customer site 140. According to this solution, border routers in the customer site do not advertise the customer site's allocated range of IP addresses to the secondary ISP 130 if they are aware that the primary ISP 120 is already advertising an aggregated route including the customer site's allocated IP addresses. In this way, the secondary ISP never receives the customer site's set of allocated IP addresses and therefore cannot break the primary ISP's route aggregation. The customer site may become aware of the primary ISP's aggregated route by receiving a BGP update message containing the aggregated route from the primary ISP. Later, if the customer site's border routers lose connectivity with the primary ISP, e.g., due to a failed data link between the customer site and the primary ISP, the customer site's border routers may advertise the customer site's set of allocated IP addresses to the secondary ISP 130. Thereafter, the secondary ISP can advertise the customer site's non-aggregated route (e.g., 10.1.1.0/24) to the backbone network 110 so as to redirect the customer site's incoming network traffic through the secondary ISP. While this solution is effective in the limited case where the customer site 140 loses communication with the primary ISP 120, the solution does not address the situation where the primary ISP 120 loses connectivity with the backbone network 110 yet continues to advertise its aggregated route.

Another possible solution for employing route aggregation in multi-homed networks is described in RFC 1998, entitled *An Application of the BGP Community Attribute in Multi-home Routing*, by Chen et al., dated August 1996, which is hereby incorporated by reference as though fully set forth herein. This solution associates BGP routes with associated "local preference" attributes, whereby a local preference value indicates a relative preference for selecting a particular address prefix in a BGP best-path computation. This solution also suffers various disadvantages. For instance, all networks and subnetworks need to be configured to understand the predetermined local preference values. Such large-scale configuration is impractical over the Internet, which consists of a large number of independently managed networks and subnetworks. Further, the solution is limited to "square" topologies as described in RFC 1998. Accordingly, the local-preference solution has limited use.

What is therefore needed is a new way of implementing route aggregation in multi-homed topologies without breaking the route aggregation, without requiring special customer-site configuration, and without having to configure a large number of networks and subnetworks. The technique also should minimize asymmetric traffic patterns at a multi-homed customer site.

SUMMARY OF THE INVENTION

The present invention provides a technique for implementing route aggregation in a computer network containing a multi-homed customer site connected to primary and second networks, which in turn are both connected to a common "backbone" network. According to the technique, the primary network allocates a block of network addresses for the customer site, and the customer site notifies the secondary network of its allocated addresses. Unlike prior implementations, the secondary network does not automatically advertise a route for reaching the customer site in response to receiving the customer site's addresses. Instead, the secondary network first determines whether the primary network has already advertised an aggregated route which incorporates the customer site's route. If so, the secondary network "suppresses" (i.e., does not advertise) the customer site's route. The secondary network only "unsuppresses" the customer site's route if it detects that the primary network has lost connectivity to the customer site and/or the backbone network. In this manner, the secondary network only advertises the customer site's route when necessary, thereby ensuring that the primary network's aggregated route is not unnecessarily overridden by a more-specific customer-site route that would take precedence in conventional longest-prefix matching algorithms.

In accordance with an illustrative embodiment, a system administrator of a primary network, such as an Internet service provider (ISP), may allocate a set of IP addresses for use by the customer site. The set of allocated addresses is represented as one or more address prefixes which are provided to the customer site. The primary network also may advertise an aggregated route that incorporates the customer site's allocated prefixes. The customer site receives both its allocated prefixes and the primary network's advertised aggregated route. Thereafter, the customer site sends the secondary network a message including (i) the customer site's allocated prefixes, (ii) an indication that the customer site is multi-homed and (iii) the aggregated route advertised by the primary network. Illustratively, the customer site sends this message as a Border Gateway Protocol (BGP) update message whose network layer reachability information (NLRI) specifies the customer site's allocated prefixes. The BGP update message preferably includes a novel dynamic conditional advertisement community (DCAC) attribute that is configured to store the customer's multi-homed indication and the aggregated route advertised by the primary network.

The customer site sends the above-noted BGP update message, including the DCAC attribute, to the secondary network. A border router in the secondary network receives the BGP update message and determines whether it has previously received the aggregated route identified in the novel DCAC attribute, e.g., either directly or indirectly from the primary network. If the border router determines that it has already received the aggregated route, the border router associates the customer site's allocated address prefixes with a conventional "no_export" BGP community attribute and then distributes the prefixes and no_export attribute in an internal BGP (iBGP) message to the other border routers in the secondary network. In this manner, the border routers in the secondary network suppress the customer site's route from being advertised outside the secondary network. Later, if the border routers in the secondary network detect that the primary network has lost connectivity with the backbone network and/or the multi-homed customer site, the border routers remove the no-export attribute for the customer site's route. As such, the customer site's route is unsuppressed and subsequently advertised as being reachable through the secondary network.

Advantageously, the present invention enables a customer site to be multi-homed to primary and secondary networks without resulting in asymmetric traffic patterns. More specifically, while the customer site's route is suppressed by the secondary network, inbound network traffic addressed to the customer site is initially directed through the primary network. However, once the secondary network unsuppresses the customer site's route, and therefore advertises the customer site's route as being reachable through the secondary network, inbound traffic to the customer site can be redirected to the secondary network due to conventional longest prefix matching algorithms employed in the computer network, i.e., the secondary network's "more specific" customer-site route becomes a preferred route over the primary network's aggregated ("less specific") route.

Further, the inventive technique permits return-path load balancing so network nodes in the secondary network can forward data directly to the customer site without first having to route the data to the primary network. The inventive technique also does not require any special customer-site configuration. Additionally, faster network convergence and better bandwidth utilization can be realized in the secondary network in response to the primary network losing connectivity with the customer site and/or the backbone network. That is, border routers in the secondary network can quickly unsuppress the customer site's route simply by removing the route's associated no-export attribute rather than having to propagate the customer-site route throughout the secondary network, e.g., using conventional iBGP update messages.

BRIEF DESCRIPTION OF THE DRAWINGS

The above and further advantages of the invention may be better understood by referring to the following description in conjunction with the accompanying drawings in which like reference numerals indicate identically or functionally similar elements, of which:

FIG. 5 is a schematic block diagram of an exemplary BGP table that may be used in accordance with the illustrative embodiments of the invention;

DETAILED DESCRIPTION OF ILLUSTRATIVE EMBODIMENTS

Figure 1:
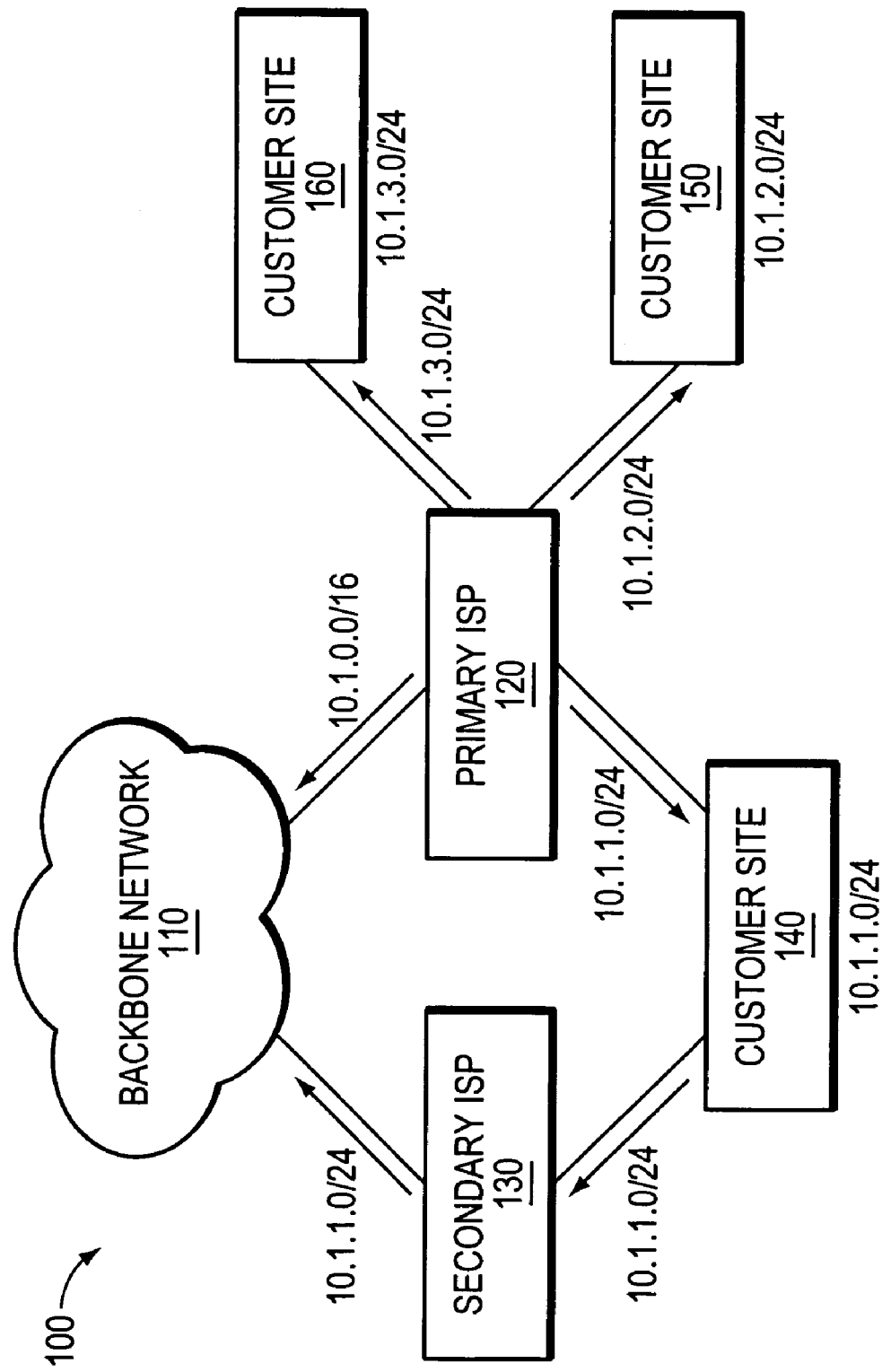
FIG. 1, previously described, is a schematic block diagram of an exemplary multi-homed computer network in which route aggregation may be employed.
Figure 2:
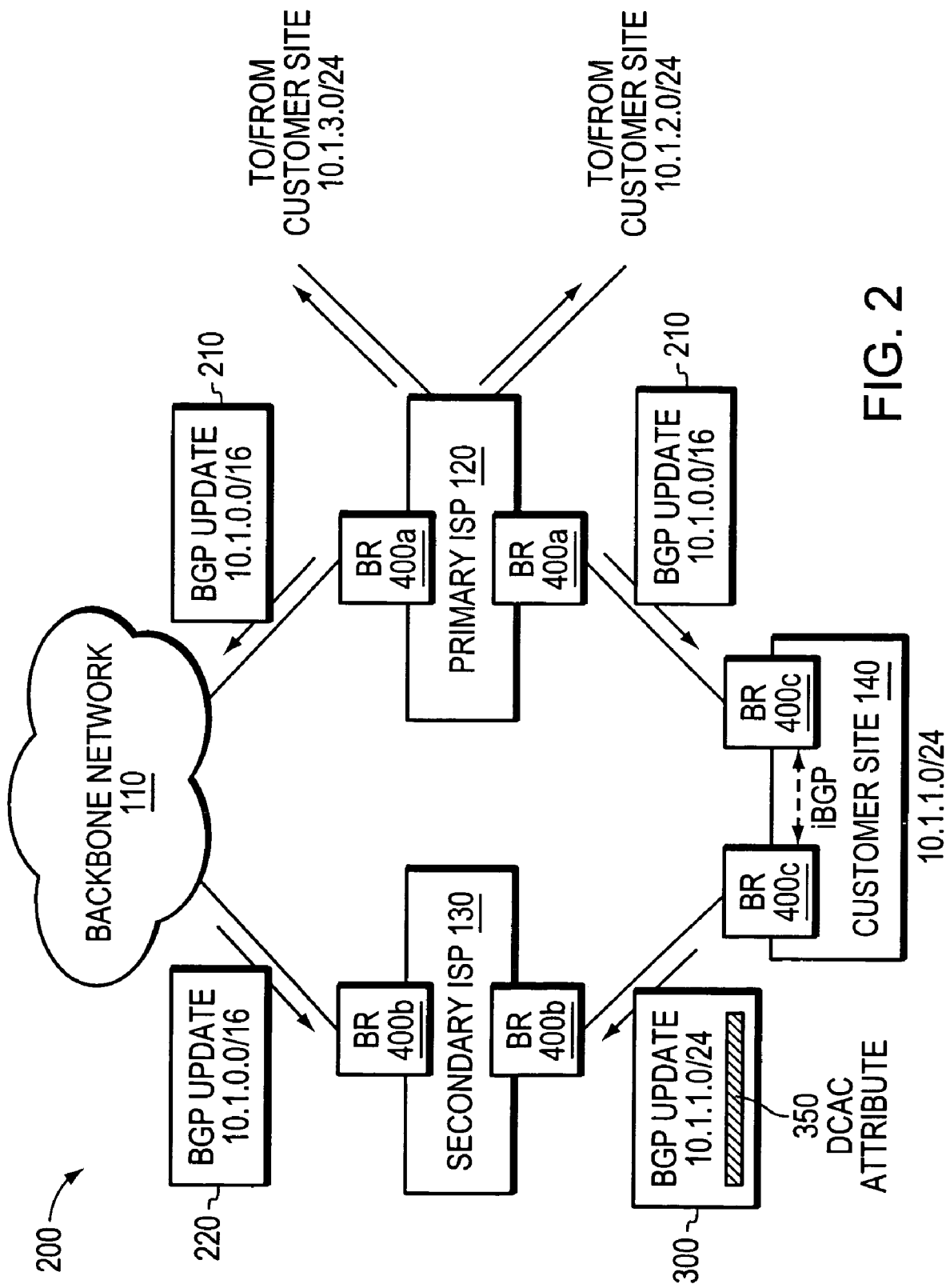
FIG. 2 is a schematic block diagram of an exemplary multi-homed computer network in which route aggregation may be employed in accordance with the illustrative embodiments of the invention.

FIG. 2 illustrates an exemplary multi-homed computer network 200 in which route aggregation may be employed in accordance with the illustrative embodiments of the invention. For ease of illustration and description, it is assumed that FIG. 2 illustrates the network after the primary ISP 120 has allocated blocks of IP addresses to its neighboring customer sites. For example, as shown, the primary ISP allocated the block of IP addresses 10.1.1.0 /24 to the multi-homed customer site 140, and allocated the blocks of IP addresses corresponding to 10.1.2.0 /24 and 10.1.3.0 /24 to its other neighboring customer sites (not shown). Although this illustrative embodiment assumes that each customer site has been allocated a single range of IP addresses (i.e., a single address prefix), those skilled in the art will appreciate that each customer site may be allocated one or more different blocks of IP addresses (i.e., one or more address prefixes).

The primary ISP 120 may aggregate at least some of its allocated blocks of customer-site IP addresses. For example, the border routers 400a in the primary ISP 120 may aggregate the prefixes 10.1.1.0 /24, 10.1.2.0 /24 and 10.1.3.0 /24 as a single aggregated prefix 10.1.0.0 /16. The primary-ISP border routers 400a then may advertise the aggregated prefix to indicate that they can reach any destination whose IP address is within the IP address range corresponding to the aggregated prefix 10.1.0.0 /16. To that end, the border routers 400a may generate BGP update messages 210 containing the aggregated route (i.e., the aggregated prefix and its associated path attributes). The border routers advertise these messages 210 to the backbone network 110 and to each of the primary ISP's neighboring customer sites.

The primary ISP's aggregated route may be propagated throughout the backbone network 110. In addition, a BGP update message 220 containing the aggregated route may be communicated from a border router (not shown) in the backbone network to a border router 400b in the secondary ISP 130. The border router 400b that receives the message 220 may distribute the aggregated route, e.g., using iBGP, to each of the other border routers 400b in the secondary ISP. In this way, each border router 400b in the secondary ISP becomes aware that the backbone network can be used to reach addresses within the primary ISP's aggregated route 10.1.0.0 /16.

A border router 400c in the multi-homed customer site 140 may receive a BGP update message 210 directly from a border router 400a in the primary ISP 120. The border router 400c that receives the message 210 may distribute the aggregated route 10.1.0.0 /16 to the other border routers 400c in the customer site, e.g., using iBGP. Further to the illustrative embodiment, a border router 400c directly connected to the secondary ISP 130 generates a BGP update message 300 that includes: one or more prefixes identifying the customer site's allocated IP addresses, an indication that the customer site is multi-homed and the aggregated route advertised by the primary ISP. The BGP update message 300 preferably stores the customer's multi-homed indication and the primary ISP's aggregated route in a novel dynamic conditional advertisement community (DCAC) attribute 350. The customer site's block of IP addresses is preferably stored as one or more address prefixes stored in the network layer reachability information (NLRI) of the BGP update message 300.

A border router 400b in the secondary ISP 130 receives the BGP update message 300 and determines whether it has previously received the primary ISP's aggregated route, as identified in the novel DCAC attribute 350, e.g., either directly or indirectly from the primary ISP 120. If the border router 400b determines that it has already received the aggregated route, the border router associates the customer site's prefix 10.1.1.0 /24 with a conventional "no_export" BGP community attribute. The customer-site's prefix and its associated no_export attribute are distributed, e.g., using iBGP, to the other border routers 400b in the secondary ISP 130. Because the no_export attribute, by definition, prevents the border routers 400b from advertising the customer site's prefix 10.1.1.0 /24 outside the boundaries of the secondary ISP, the border routers 400b effectively "suppress" advertisements of the customer site's route and thus prevent the customer-site route from being advertised to the backbone network 110.

In an alternative illustrative embodiment, the border router 400b that receives the BGP update message 300 associates the customer site's prefix 10.1.1.0 /24 with a conventional "no_advertise" community attribute, rather than with a no_export community attribute. In this embodiment, the customer site's prefix is only suppressed at the border router 400b that received the BGP update message 300. In other words, the no_advertise community attribute prevents the receiving border router 400b from advertising the customer site's prefix to any other nodes, even those located within the secondary ISP 130.

Figure 3:
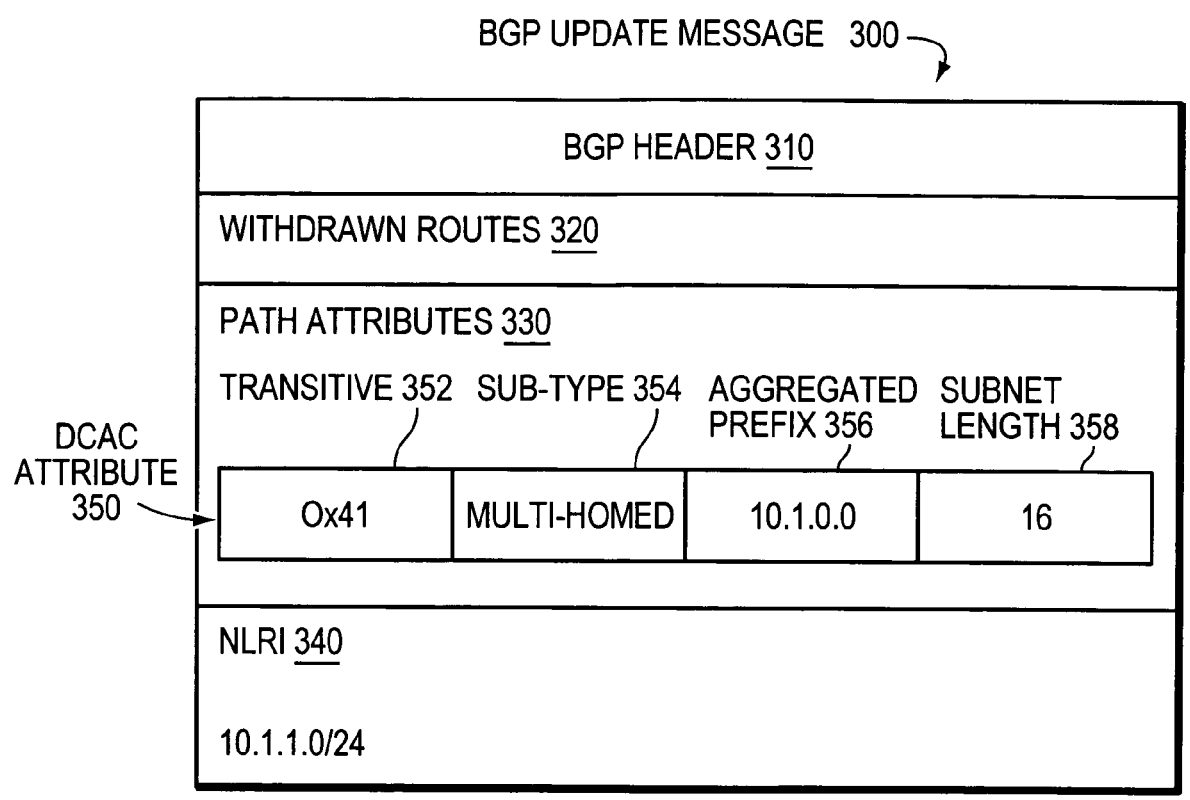
FIG. 3 is a schematic block diagram of an exemplary BGP update message that may be used in accordance with the illustrative embodiments of the invention.

FIG. 3 illustrates an exemplary BGP update message 300 that may be used in accordance with the illustrative embodiments. The update message 300 includes a BGP header 310, a set of withdrawn routes 320, a set of path attributes 330 and a set of network layer reachability information 340. The BGP header 310 may be configured to store, among other things, the length (in bytes) of the message 300, a type value (e.g., equal to 2) identifying the message as a BGP update message and a conventional 16-byte BGP marker, as known in the art. The set of withdrawn routes 320 is configured to store zero or more address prefixes that are no longer reachable through the sending border router. For instance, a border router may withdraw a set of routes in response to a topology change, such as a failed data link or network node, that results in network traffic becoming inaccessible over the withdrawn routes. In contrast, the NLRI 340 specifies zero or more address prefixes that are reachable (i.e., accessible) to the sending border router. For instance, in the exemplary update message 300, the NLRI stores the customer-site prefix 10.1.1.0 /24 to indicate that the sending border router 400c can access destination addresses in the customer site's allocated block of IP addresses.

The set of path attributes 330 is configured to store zero or more BGP attributes that characterize the prefixes stored in the NLRI 340. In this context, a path attribute is generally any property or characteristic that may be associated with the NLRI prefix(es), e.g., such as a cost metric, bandwidth constraint, next-hop identifier and so forth. For example, the set of path attributes may include a "Next Hop" attribute (not shown) that indicates which border router 400c should be used as the next hop to reach destinations whose IP addresses match the NLRI prefix 10.1.1.0 /24. Other conventional BGP attributes and their formats are generally well known and are described in more detail in Chapter 6 of the reference book entitled *IP Switching and Routing Essentials*, by Stephen A. Thomas, published 2002 which is hereby incorporated by reference in its entirety.

The set of path attributes 330 also includes the novel DCAC attribute 350. Preferably, the DCAC attribute is formatted as an IPv4-address-specific extended community attribute, as described in the above-incorporated IETF publication draft-ietf-idr-bgp-ext-communities-07.txt, by Sangli et al. The DCAC attribute 350 includes a transitive field 352, a sub-type field 354, an aggregated-prefix field 356 and a subnet-length field 358. Here, the aggregated-prefix and subnet-length fields respectively may correspond to the global and local administrator fields of an IPv4-address-specific extended community attribute. Of course, those skilled in the art will understand that the IPv4-address-specific extended community attribute format is merely one exemplary format that may be used with advantage in the present invention. Accordingly, other BGP attribute formats may be capable of transporting the contents of the illustrative DCAC attribute and alternatively may be utilized without loss of generality.

In the illustrative DCAC attribute 350, the transitive field 352 stores a value, such as 0×41 (in hexadecimal), that indicates that the DCAC attribute may be distributed between neighboring networks and subnetworks, such as between the customer site 140 and the secondary ISP 130. The sub-type field 354 stores a value that indicates that the sending border router 400c resides in a multi-homed customer site. Thus, the border router 400b that receives the DCAC attribute 350 should be configured to recognize the multi-homed indication stored in the sub-type field 354. The aggregated-prefix field 356 stores the aggregated prefix which is advertised by the primary ISP 120. The subnet length field 358 stores the subnet-mask length corresponding to the aggregated prefix stored in field 356. For instance, in the exemplary DCAC attribute shown, the fields 356 and 358 respectively store 10.1.0.0 and 16 to indicate that the primary ISP 120 advertises the aggregated prefix 10.1.0.0 /16.

In operation, a customer-site border router 400c typically establishes a TCP session with a secondary-ISP border router 400b, and BGP messages are subsequently communicated over that TCP session. Preferably, after the TCP session-establishment procedure, the customer-site border router 400c notifies the secondary-ISP border router 400b that it is configured to communicate DCAC attributes 350. This capability may be communicated during a BGP capability exchange over the established TCP session. For instance, a BGP capability advertisement may be sent from the customer-site border router 400b to the secondary-ISP border router 400b to indicate that the customer-site is configured to advertise DCAC attributes. Such BGP capability advertisements are generally set forth in more detail in RFC 3392, entitled *Capabilities Advertisement with BGP-4*, by R. Chandra et al., published November 2002, which is hereby incorporated by reference in its entirety. In this way, the secondary-ISP border router 400b may become aware that it may receive DCAC attributes 350 from the customer-site border router 400c. Variations of the novel DCAC attribute, such as different attribute formats or contents, also may be negotiated as part of the TCP session-establishment procedure.

Figure 4:
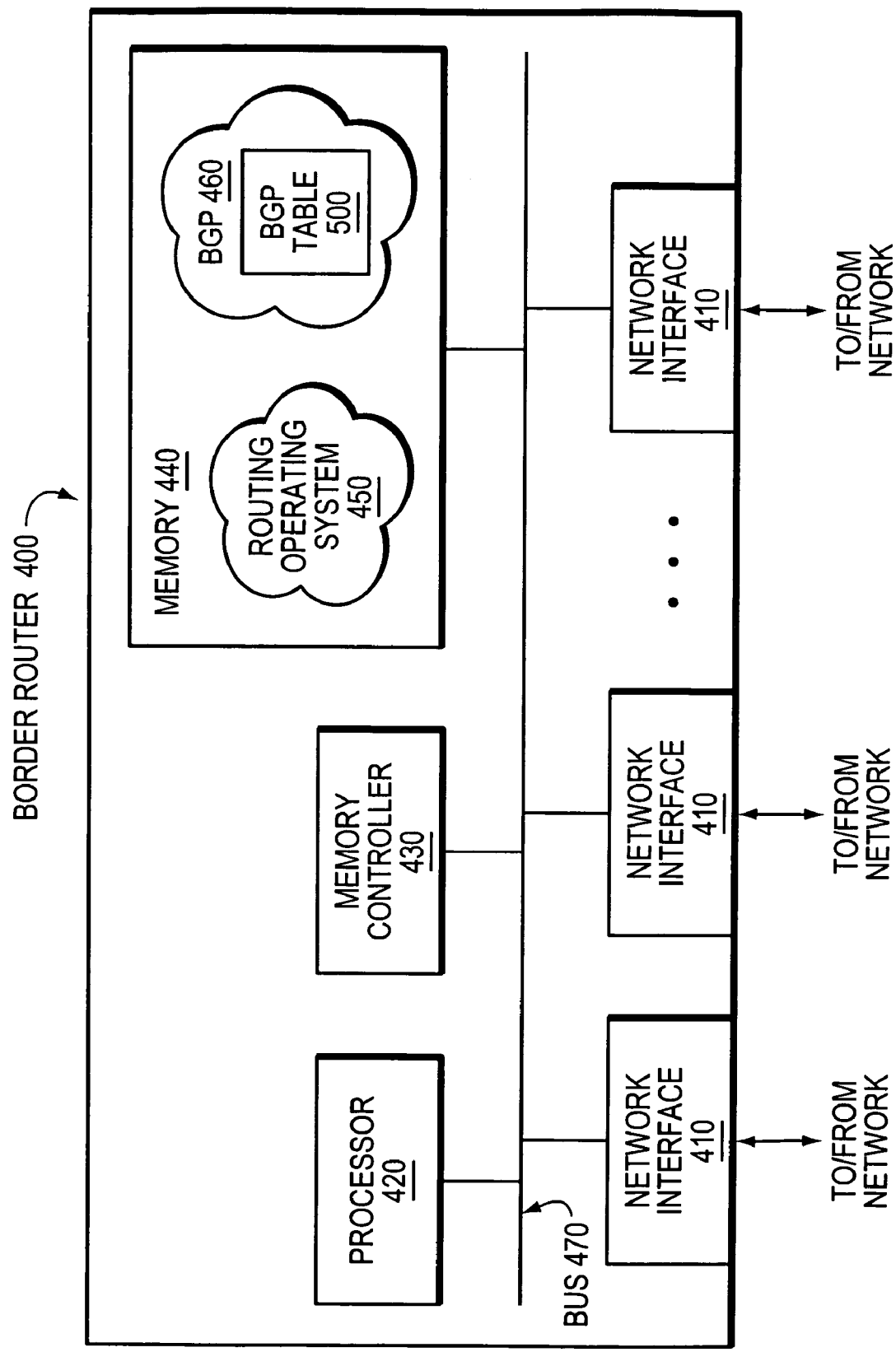
FIG. 4 is a schematic block diagram of an exemplary border router that may be advantageously used in accordance with the illustrative embodiments of the invention.

FIG. 4 is a schematic block diagram of an exemplary border router 400 that may be advantageously used in the illustrative embodiments of the invention. For ease of illustration and description, the border router 400 is illustrated on a generic hardware platform. However, in alternative embodiments, the border router may contain a plurality of line cards which are interconnected with a route processing engine through a switching fabric (i.e., backplane logic and circuitry). Accordingly, those skilled in the art will appreciate that the depicted border router 400 is merely exemplary and that the advantages of the present invention may be realized on a variety of different hardware platforms having various software capabilities.

The border router 400 comprises a plurality of network interfaces 410, a processor 420, a memory controller 430 and a memory 440 interconnected by a system bus 470. The network interfaces 410 contain the mechanical, electrical and signaling logic and circuitry for communicating data over physical links coupled to the network 200. The network interfaces may be configured to transmit and/or receive data using a variety of different communication protocols, including, inter alia, TCP/IP, Asynchronous Transfer Mode (ATM), User Datagram Protocol (UDP), synchronous optical networks (SONET), synchronous digital hierarchy (SDH), wireless protocols, Frame Relay, Ethernet, Fiber Distributed Data Interface (FDDI), etc.

The memory 440 comprises a plurality of storage locations, which are addressable by the processor 420 and the network interfaces 410 via the memory controller 430. The memory storage locations are adapted to store program code and data structures associated with the present invention. The processor 420 comprises circuitry and logic adapted to execute the program code and manipulate the data structures. The memory 440 preferably comprises a form of random access memory (RAM) that is generally cleared by a power cycle or other reboot operation (e.g., it is a "volatile" memory). It will be apparent to those skilled in the art that the memory 440 also may comprise other memory means, including various computer-readable media, for storing program instructions and data structures pertaining to the operation of the border router 400. Further, those skilled in the art will appreciate that at least some portions of the memory 440 may be embodied as electromagnetic signals that are transmitted from a remote memory element to the border router 400.

The memory 440 stores, among other things, computer-readable instructions for implementing a routing operating system 450 that functionally organizes the border router 400 by, inter alia, invoking network operations in support of software processes and services executing in the border router 400. The IOS™ operating system by Cisco Systems Incorporated is one example of such a routing operating system 450. The software processes and services supported by the routing operating system include a BGP process 460. The BGP process includes computer-executable instructions that enable the processor 420 to implement external BGP (eBGP) and internal BGP (iBGP) functionality. The BGP process 460 may be configured to manage the contents of a BGP table 500 which lists feasible routes to reachable (i.e., accessible) network nodes. As previously noted, a BGP "route" includes an address prefix and its associated path attributes.

FIG. 5 illustrates an exemplary BGP table 500 that may be stored in the memory 440. Each table entry 505 contains an address prefix 510, a dynamic conditional advertisement community attribute 520, a BGP community attribute 530 and other BGP attributes 540. The address prefix 510 may store an IP address prefix that is reachable to the border router 400. The DCAC attribute 520 stores, among other things, an indication that the prefix 510 is reachable through a multi-homed network or subnetwork and an aggregated prefix advertised by a primary service provider. The community attribute 530 is a conventional BGP attribute that may store a value indicating the relative scope in which the prefix 510 may be advertised. For instance, the community attribute may equal a value corresponding to "no_export," thereby indicating that the prefix may not be advertised outside of the border router's network or subnetwork. Alternatively, the community attribute 530 may store a value corresponding to "no_advertise," thereby indicating that the border router 400 may not advertise the prefix 510 at all. The other BGP attributes 540 may include other BGP path attributes, such as a BGP Origin attribute, Next Hop attribute, AS Path attribute, Local Pref attribute, etc., as conventionally known in the art.

By way of example, the illustrated BGP table 500 is configured for use in a border router 400b in the secondary ISP 130. A first table entry 505a stores an aggregated prefix, e.g., 10.1.0.0/16, that was advertised by the primary ISP 120. The aggregated prefix may have been received, e.g., in a BGP update message 220 transmitted from a border router (not shown) in the backbone network 110 or in a BGP update message 210 transmitted directly from a border router 400a in the primary ISP 120. A second table entry 505b stores a prefix, e.g., 10.1.1.0/24, advertised by the multi-homed customer site 140. In this case, the customer-site prefix 10.1.1.0/24 is associated with a DCAC attribute 520 which stores a multi-homed indication (not shown) and an aggregated prefix 10.1.0.0/16. The DCAC attribute's multi-homed indication indicates that the prefix 10.1.1.0/24 corresponds to a customer site 140 that is multi-homed, and the DCAC attribute's prefix 10.1.0.0/16 identifies an aggregated route that is advertised by the primary ISP 120 coupled to the multi-homed customer site.

In accordance with the illustrative embodiments, the BGP process 460 is configured to recognize that the prefix (e.g., 10.1.0.0/16) stored in the DCAC attribute 520 of the second table entry 505b is equivalent to the address prefix 510 stored in the first table entry 505a. To make this determination, the BGP process may "walk" (or otherwise search) the BGP table entries 505, comparing prefixes stored in received DCAC attributes 520 with received aggregated prefixes 510. Advantageously, in response to determining that these prefixes are equivalent, the BGP process 460 automatically associates a no_export (or no_advertise) community attribute 530 with the customer-site prefix 510 stored in the second table entry 505b. In this way, the customer site's address prefix 10.1.1.0/24 is automatically "suppressed" (i.e., not permitted to be advertised) by the secondary-ISP border router 400b while the aggregated prefix 10.1.0.0/16 is advertised by the primary ISP 120. As such, the secondary ISP does not advertise the customer site's "more specific" route to the backbone network 110, and, accordingly, the primary ISP's route aggregation is not broken in the backbone network. Moreover, because the backbone network only receives the aggregated route 10.1.0.0/16 from the primary ISP, and does not receive the more-specific customer-site route from the secondary ISP, all incoming network traffic to the multi-homed customer site 140 is directed through the primary ISP, as intended.

Further to the illustrative embodiments, the inventive technique permits return-path load balancing so that the border routers 400b in the secondary ISP 130 can forward data directly to the customer site 140 without first having to route the data to the primary ISP 120. More specifically, because the border routers 400*b* store the customer-site route 10.1.1.0 /24 in their BGP tables 500, the longest-prefix matching algorithms performed at the border routers 400*b* enable the border routers 400*b* to select a BGP "best path" directly to the customer site, rather than via the primary ISP 120. In other words, route aggregation is broken only within the secondary ISP 130, such that the longest-prefix matching algorithms in the secondary ISP will select the more-specific customer route 10.1.1.0 /24 rather than the primary ISP's less-specific aggregated route 10.1.0.0 /16 when selecting a best path to forward network traffic to the customer site 140. Thus, the customer site may directly receive incoming network traffic originating in the secondary ISP 130, whereas all other incoming traffic will be directed through the primary ISP 120.

Figure 6:
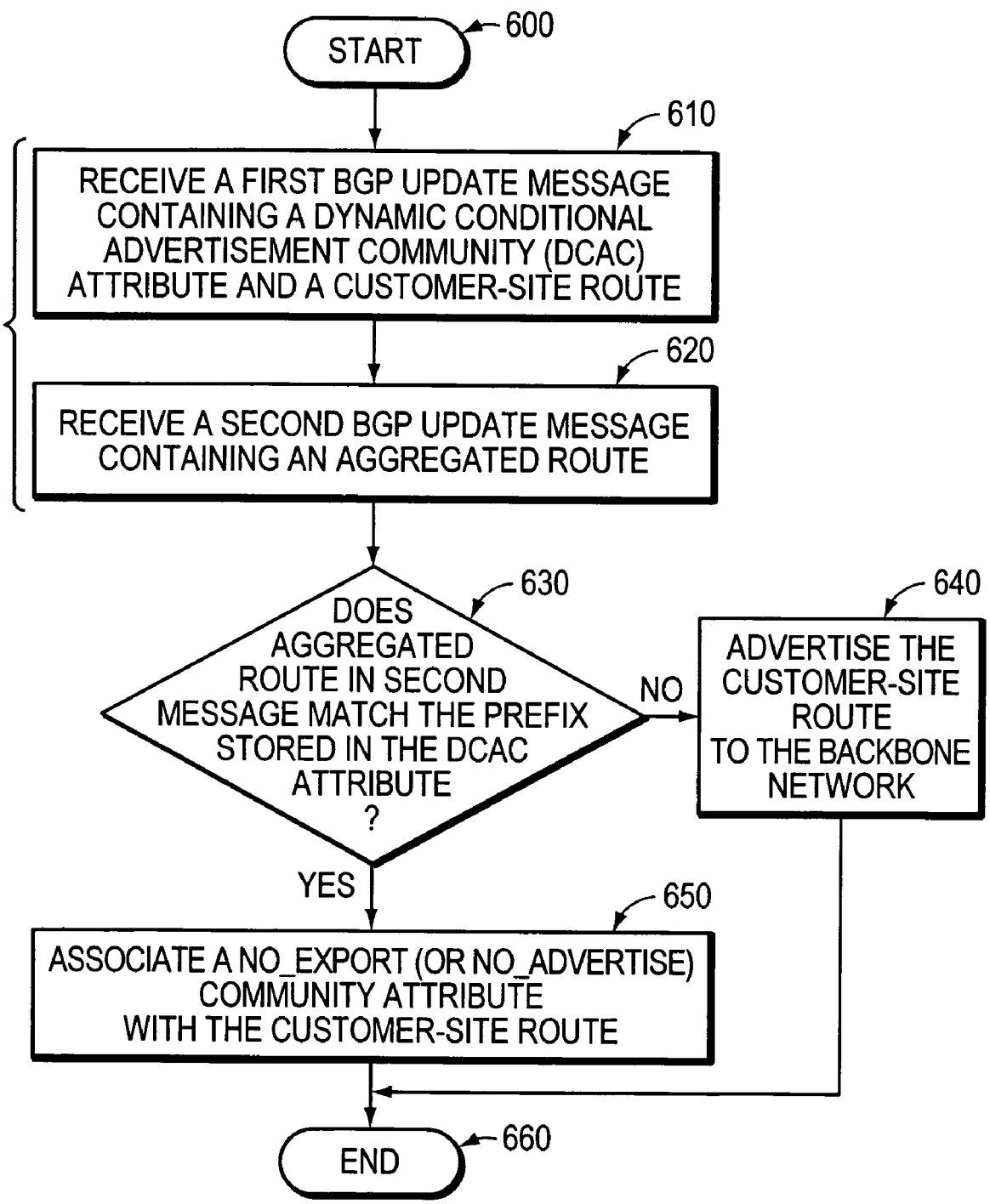
FIG. 6 is a flowchart illustrating a sequence of steps that enable a border router to suppress a customer-site route in accordance with the illustrative embodiments of the invention.

FIG. 6 illustrates a sequence of steps that a border router 400*b* in the secondary ISP 130 may perform for suppressing a customer-site route in accordance with the illustrative embodiments. The sequence starts at step 600 and proceeds to step 610 where the border router 400*b* receives a first BGP update message containing the customer-site route and a corresponding DCAC attribute. At step 620, the border router 400*b* receives a second BGP update message containing an aggregated route, e.g., advertised either directly or indirectly from the primary ISP 120. The first and second BGP update messages may be iBGP or eBGP messages received at the secondary-ISP border router. It is noted that the steps 610 and 620 need not be performed in the order shown, and may be performed in any order. That is, the border router 400*b* may receive the first BGP update message before or after it receives the second BGP update message.

At step 630, the BGP process 460 in the border router 400*b* determines whether the aggregated route stored in the second BGP update message matches a prefix stored in the DCAC attribute of the first BGP update message. To that end, the BGP process may "walk" the border router's BGP table 500 to compare the received aggregated route with prefixes stored in previously-received DCAC attributes 520. Alternatively, the BGP process may search the BGP table 500 to compare the prefix stored in the received DCAC attribute with previously-received address prefixes 510. In either case, if the BGP process determines that the received aggregated route does not match the prefix stored in the DCAC attribute, then at step 640 the received customer-site route is advertised to the backbone network 110. The sequence ends at step 660.

On the other hand, if the BGP process 460 determines that the aggregated route in the second BGP update message matches the prefix stored in the DCAC attribute received of the first BGP update message, the BGP process associates a no_export (or no_advertise) BGP community attribute with the received customer-site route. The BGP process 460 may store the customer-site route and its associated DCAC and no_export attributes in an appropriate entry 505 of the border router's BGP table 500; the sequence ends at step 660. Here, the no_export community attribute ensures that the received customer-site route is not advertised to the backbone network 110, and therefore remains suppressed by the secondary-ISP border router 400*b*. Further to the illustrative embodiments, the border router 400*b* may unsuppress (i.e., advertise) a previously-suppressed customer-site route in the event that the border router detects a loss of network connectivity between the primary ISP 120 and the backbone network 110 or between the multi-homed customer site 140 and the primary ISP.

Figure 7:
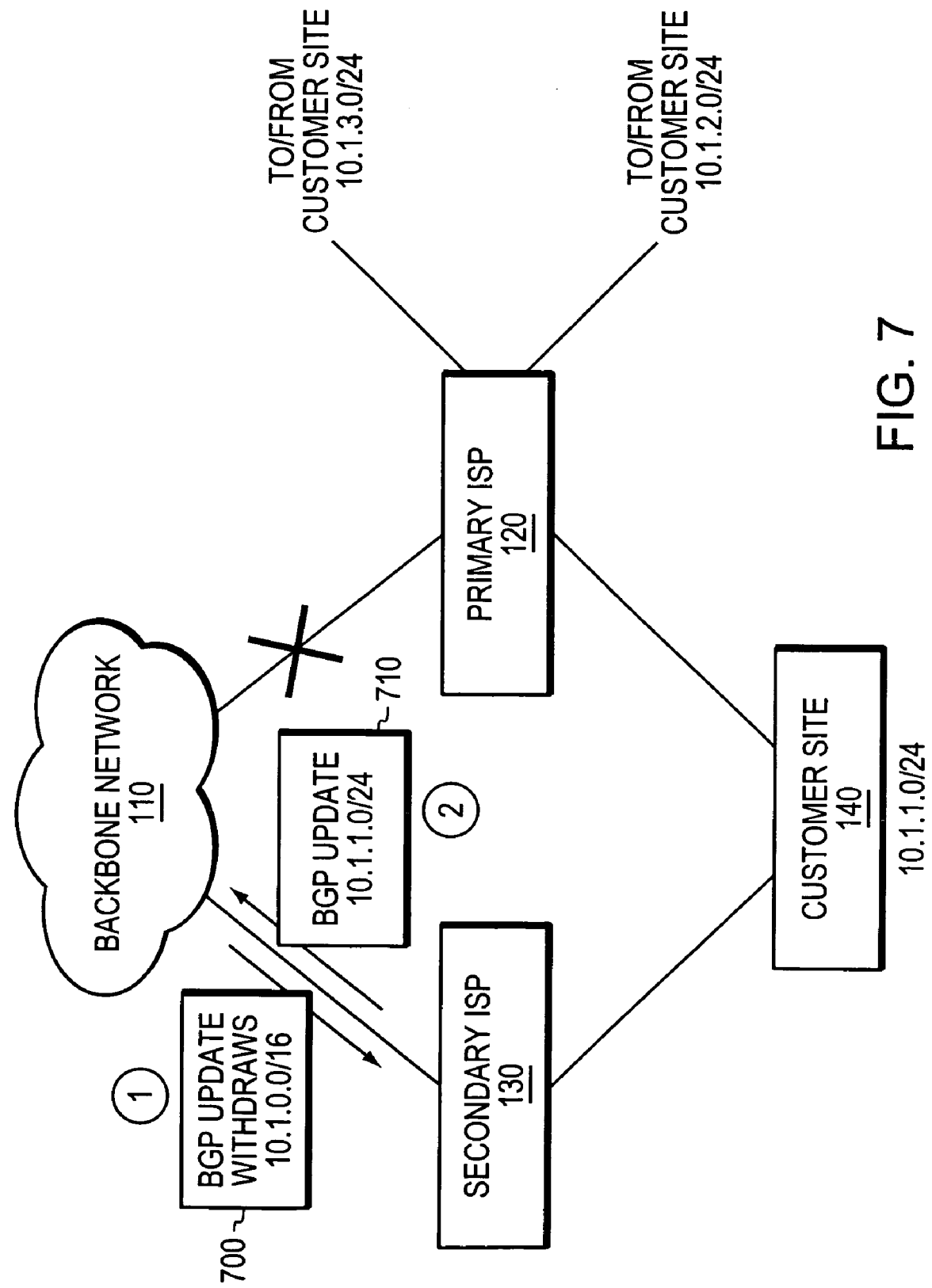
FIG. 7 is a schematic block diagram of an exemplary multi-homed computer network in which a secondary service provider determines that a primary service provider has lost network connectivity with a backbone network.

FIG. 7 illustrates a scenario where the secondary ISP 130 determines that the primary ISP 120 has lost network connectivity with the backbone network 110. In this case, a border router (not shown) in the backbone network sends a BGP update message 700 which indicates that the aggregated route previously advertised by the primary ISP 120 has been withdrawn, and is therefore no longer reachable through the backbone network. The withdrawn route is distributed, e.g., using iBGP, to each of the border routers 400*b* in the secondary ISP 130. In response to receiving this withdrawn route, a border router 400*b* removes any no_export (or no_advertise) community attributes 530 associated with customer-site routes 510 whose DCAC attributes 520 store the withdrawn route. After removing these no_export (or no_advertise) community attributes, the previously suppressed customer-site routes then can be advertised to the backbone network 110, e.g., in a BGP update message 710. Thereafter, network traffic address to the multi-homed customer site 140 is directed through the secondary ISP 130 due to the conventional longest prefix matching algorithms employed in the backbone network.

Figure 8:
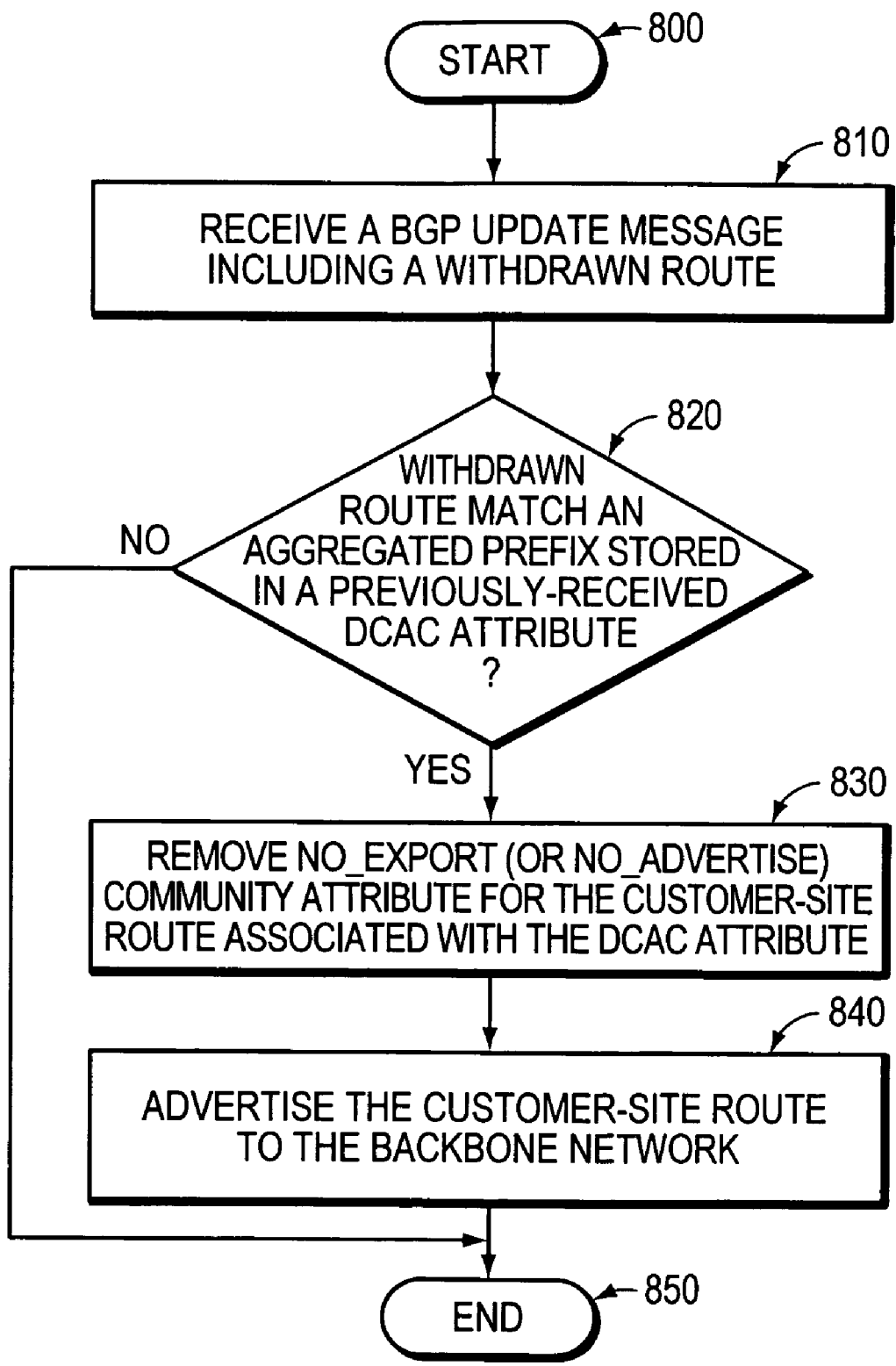
FIG. 8 is a flowchart illustrating a sequence of steps that enable a border router to unsuppress a customer-site route after the border router determines that a primary service provider has lost network connectivity with a backbone network, in accordance with the illustrative embodiments of the invention.

FIG. 8 illustrates a sequence of steps that a border router 400*b* in the secondary ISP 130 may perform when unsuppressing a customer-site route after determining that the primary ISP 120 has lost network connectivity with the backbone network 110. The sequence starts at step 800 and proceeds to step 810 where the border router 400*b* receives a BGP update message including a withdrawn route. Next, at step 820, the BGP process 460 may "walk" the border router's BGP table 500 to determine whether the received withdrawn route matches an aggregated prefix stored in a previously-received DCAC attribute 520. If not, the sequence ends at step 850. However, if the withdrawn route matches an aggregated prefix stored in a previously-received DCAC attribute, then, at step 830, the BGP process 460 removes the no_export (or no_advertise) community attribute 530 for the customer-site route 510 associated with the DCAC attribute. At step 840, the customer-site route 510 is advertised to the backbone network 110, i.e., since the route is no longer associated with a no_export community attribute. The sequence ends at step 850.

Figure 9:
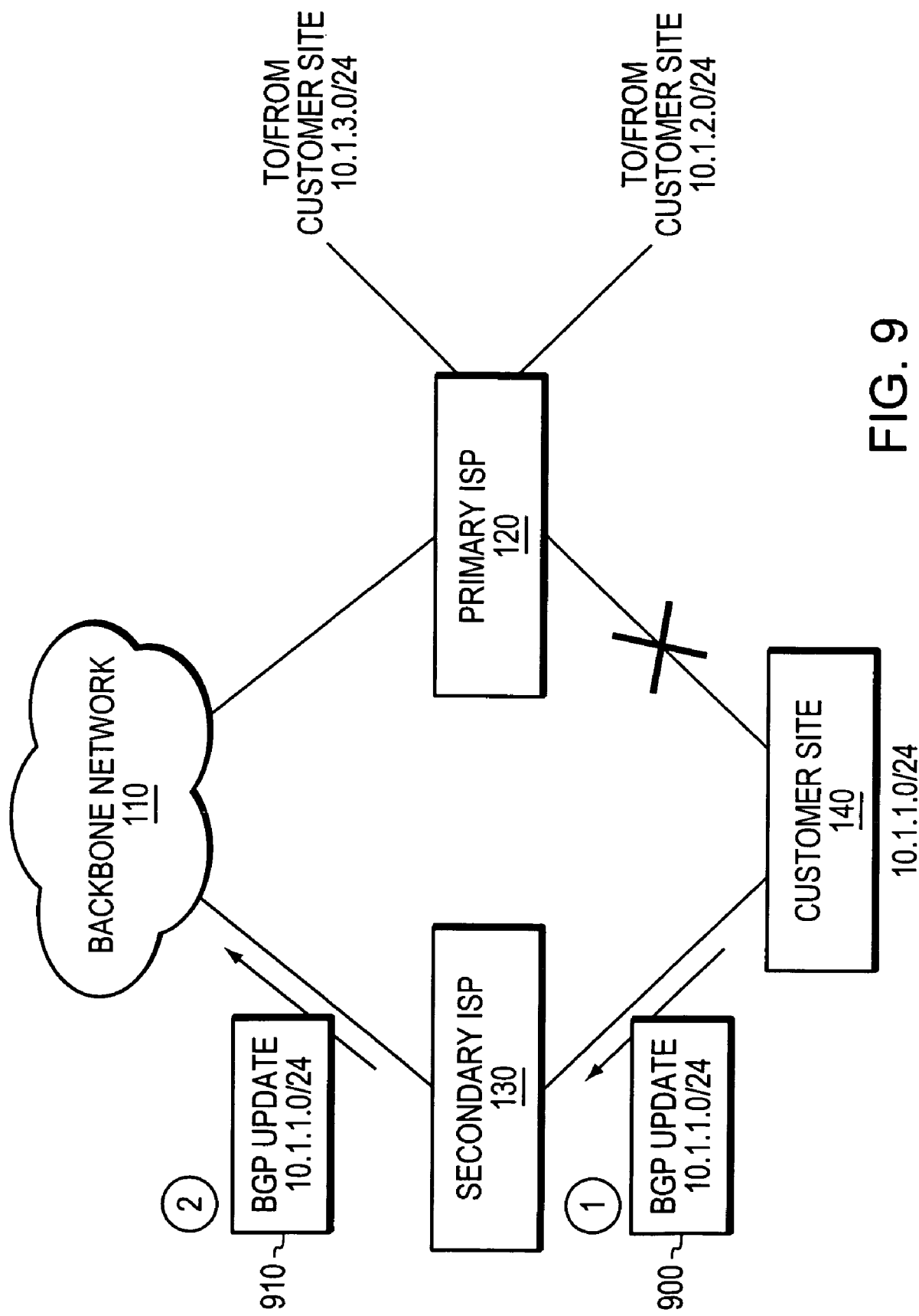
FIG. 9 is a schematic block diagram of an exemplary multi-homed computer network in which a secondary service provider determines that a multi-homed customer site has lost connectivity with its primary service provider.

FIG. 9 illustrates a scenario in which the secondary ISP 130 determines that the multi-homed customer site 140 has lost connectivity with the primary ISP 120. In this case, the customer site 140 sends a BGP update message 900 specifying the customer site's allocated block of IP addresses, e.g., 10.1.1.0 /24, without also including a corresponding DCAC attribute 350. Because the advertised customer-site route is not associated with a DCAC attribute, border routers 400*b* in the secondary ISP can determine that the customer site is no longer multi-homed to the primary ISP 120. As a result, the border routers 400*b* automatically remove from their respective BGP tables 500 any no_export (or no_advertise) community attributes that were previously associated with the customer-site route. After removing the no_export (or no_advertise) community attributes, the border routers 400*b* advertise the unsuppressed customer-site route, e.g., in a BGP update message 910, to the backbone network 110. Thereafter, incoming traffic addressed to the customer site 140 is directed through the secondary ISP 130 due to conventional longest prefix matching algorithms employed in the backbone network.

Figure 10:
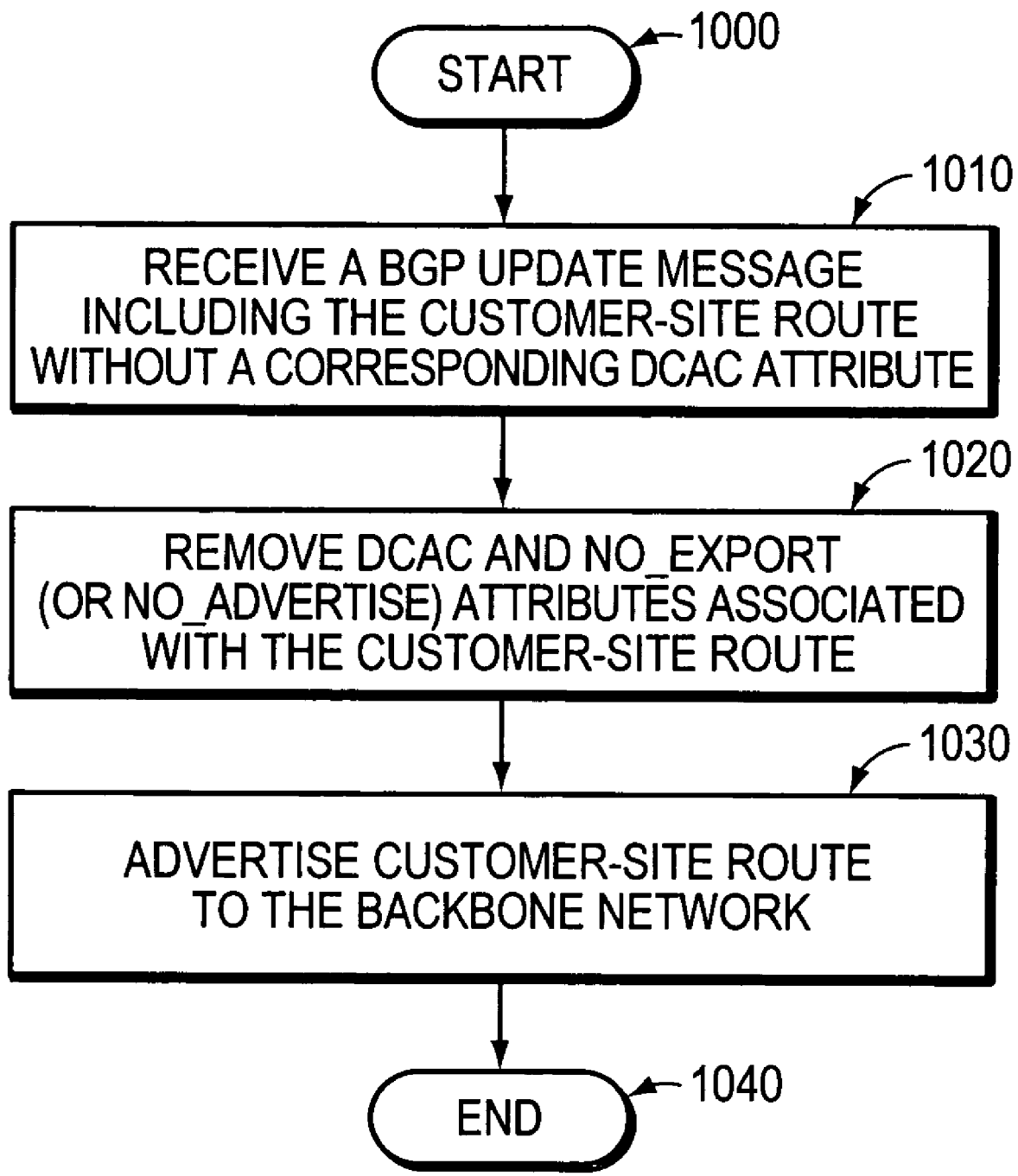
FIG. 10 is flowchart illustrating a sequence of steps that enable a border router to unsuppress a customer-site route after the border router determines that a multi-homed customer site has lost network connectivity with its primary service provider, in accordance with the illustrative embodiments of the invention.

FIG. 10 illustrates a sequence of steps that a border router 400*b* in the secondary ISP 130 may perform when unsuppressing a customer-site route after determining that the customer site 140 has lost network connectivity with the primary ISP 120. The sequence starts at step 1000 and advances to step 1010 where the border router 400*b* receives a BGP update message 900 containing the customer site's allocated block of IP addresses, but without any corresponding DCAC attribute

350. The received customer-site route is stored in an appropriate table entry 505 in the border router's BGP table 500.

If the BGP process 460 executing in the border router 400b determines that the BGP table 500 already contains an entry 505 for the customer-site route, the BGP process removes any DCAC and/or no_export (or no_advertise) attributes previously associated with the customer-site route, at step 1020. The customer-site route is disseminated among the secondary-ISP border routers 400b, e.g., using iBGP, without also disseminating a corresponding DCAC attribute. Accordingly, each border router 400b in the secondary ISP 130 can unsuppress the customer-site route by removing any DCAC and no_export attributes previously associated with the route from their BGP tables 500. At step 1030, the unsuppressed customer-site route is advertised to the backbone network 110. The sequence ends at step 1040.

Advantageously, the illustrative embodiments enable a customer site 140 to be multi-homed to primary and secondary ISPs 120 and 130 without resulting in asymmetric traffic patterns at the customer site. More specifically, while the customer site's route is suppressed by the secondary ISP, inbound network traffic addressed to the customer site is initially directed through the primary ISP. However, once the secondary ISP unsuppresses the customer site's route, and therefore advertises the customer site's route as being reachable through the secondary ISP, inbound traffic to the customer site can be redirected to the secondary ISP due to conventional longest prefix matching algorithms employed in the backbone network.

Further, the inventive technique permits return-path load balancing so border routers in the secondary ISP 130 can directly forward data to the customer site 140 without first having to route the data to the primary network 120. The inventive technique also does not require any special configuration at the customer site's border routers 400c. Additionally, faster network convergence and better bandwidth utilization can be realized in the secondary ISP in response to the primary ISP losing connectivity with the customer site and/or the backbone network. That is, border routers in the secondary ISP can quickly unsuppress the customer site's route simply by removing the route's associated no-export attribute rather than having to propagate the customer-site route throughout the secondary ISP, e.g., using conventional iBGP update messages.

The foregoing has been a detailed description of illustrative embodiments of the invention. Various modifications and additions can be made without departing from the spirit and scope of the invention. For example, while the inventive technique has been illustratively described with respect to an exemplary multi-homed network topology, it is also expressly contemplated that the invention may be deployed in other (possibly more complex) types of network topologies, which may include one or more autonomous systems, broadcast domains, routing areas, etc.

It is expressly contemplated that the teachings of this invention can be implemented as software, including a computer-readable medium having program instructions executing on a computer, hardware, firmware, or a combination thereof. For instance, the invention may be implemented by a border router 400 having one or more processors, some of which may reside on the network interfaces 410 or on line cards containing the network interfaces. Further, the memory 440 may be distributed among a plurality of different memory elements, both local and remote to the border router 400. The inventive technique therefore may be implemented in various combinations of hardware and/or software. Accordingly, this description is meant to be taken only by way of example and not to otherwise limit the scope of the invention.

What is claimed is:

1. A method for implementing route aggregation in a computer network containing a multi-homed network connected to primary and secondary networks, the method comprising:
   allocating a block of network addresses for the multi-homed network;
   notifying the secondary network of the block of network addresses allocated for the multi-homed network;
   determining, at a network node of the secondary network, whether the primary network has advertised an aggregated route including the multi-homed network's allocated block of network addresses; and
   suppressing, at one or more network nodes of the secondary network, advertisements containing the multi-homed network's allocated block of network addresses in response to determining that the primary network has already advertised an aggregated route including the multi-homed network's allocated block of network addresses.

2. The method of claim 1, wherein the step of determining whether the multi-homed network has lost network connectivity with the primary network further comprises:
   sending a message to the secondary network, the message indicating that the multi-homed network has lost network connectivity with the primary network.

3. The method of claim 1, further comprising:
   determining, at the network node of the secondary network, whether the primary network has lost network connectivity with a backbone network; and
   unsuppressing, at the one or more network nodes of the secondary network, the advertisements containing the multi-homed network's allocated block of network addresses in response to determining that the primary network has lost network connectivity with the backbone network.

4. The method of claim 3, wherein the step of determining whether the primary network has lost network connectivity with the backbone network further comprises:
   sending a message to the secondary network, the message indicating that the aggregated route advertised by the primary network is no longer reachable.

5. The method of claim 1, wherein the step of notifying the secondary network of the multi-homed network's allocated block of network addresses further comprises:
   sending the secondary network (i) at least one address prefix corresponding to the multi-homed network's allocated block of network addresses, (ii) an indication that the multi-homed network is multi-homed and (iii) the aggregated route advertised by the primary network.

6. The method of claim 5, further comprising:
   storing the at least one address prefix corresponding to the multi-homed network's allocated block of network addresses, the indication that the multi-homed network is multi-homed and the aggregated route advertised by the primary network in a dynamic conditional advertisement community (DCAC) attribute; and
   sending the DCAC attribute to the secondary network.

7. The method of claim 6, wherein the DCAC attribute is formatted as an IPv4-address-specific extended community attribute.

8. The method of claim 1, wherein the step of suppressing advertisements containing the multi-homed network's allocated block of network addresses further comprises:

associating a no_export community attribute with the multi-homed network's allocated block of network addresses.

9. The method of claim 8, further comprising:
unsuppressing the advertisements containing the multi-homed network's allocated block of network addresses by removing the no_export community attribute.

10. The method of claim 1, wherein the step of suppressing advertisements containing the multi-homed network's allocated block of network addresses further comprises:
associating a no_advertise community attribute with the multi-homed network's allocated block of network addresses.

11. The method of claim 10, further comprising:
unsuppressing the advertisements containing the multi-homed network's allocated block of network addresses by removing the no_advertise community attribute.

12. The method of claim 1, wherein the step of determining whether the primary network has advertised the aggregated route including the multi-homed network's allocated block of network addresses further comprises:
searching a BGP table for the aggregated route.

13. The method of claim 1, wherein the step of determining whether the primary network has advertised the aggregated route including the multi-homed network's allocated block of network addresses further comprises:
receiving, at the network nodes of the secondary network, a message containing the aggregated route.

14. A computer network that implements route aggregation, the computer network including a multi-homed network connected to primary and secondary networks, the computer network comprising:
means for allocating a block of network addresses for the multi-homed network;
means for notifying the secondary network of the block of network addresses allocated for the multi-homed network;
means for determining, at the secondary network, whether the primary network has advertised an aggregated route including the multi-homed network's allocated block of network addresses; and
means for suppressing, at the secondary network, advertisements containing the multi-homed network's allocated block of network addresses in response to determining that the primary network has already advertised an aggregated route including the multi-homed network's allocated block of network addresses.

15. The computer network of claim 14, further comprising:
means for determining, at the secondary network, whether the primary network has lost network connectivity with a backbone network; and
means for unsuppressing, at the secondary network, the advertisements containing the multi-homed network's allocated block of network addresses in response to determining that the primary network has lost network connectivity with the backbone network.

16. A border router deployed in a computer network, the computer network containing a multi-homed network connected to primary and secondary networks, the border router situated in the secondary network, the border router comprising:
a processor;
a network interface adapted to receive a message from the multi-homed network, the message including a block of network addresses allocated for the multi-homed network; and
a memory adapted to store instructions which are executable by the processor for performing the steps of:
determining whether the primary network has advertised an aggregated route including the multi-homed network's allocated block of network addresses; and
suppressing advertisements containing the multi-homed network's allocated block of network addresses in response to determining that the primary network has already advertised an aggregated route including the multi-homed network's allocated block of is network addresses.

17. The border router of claim 16, wherein the memory further comprises instructions for performing the steps of:
determining whether the primary network has lost network connectivity with a backbone network; and
unsuppressing the advertisements containing the multi-homed network's allocated block of network addresses in response to determining that the primary network has lost network connectivity with the backbone network.

18. A border router deployed in a computer network, the computer network containing a multi-homed network connected to primary and secondary networks, the border router situated in the multi-homed network, the border router comprising:
a first network interface adapted to receive a block of network addresses from the primary network; and
a second network interface adapted to transmit a message to the secondary network, the message including:
(i) the block of network addresses received at the first network interface,
(ii) an indication that the multi-homed network is multi-homed, and
(iii) an aggregated route advertised by the primary network,
wherein the message indicates to the secondary network that advertisements containing the block of network addresses are to be suppressed as long as the aggregate route is advertised by the primary network.

19. The border router of claim 18, wherein the message is a Border Gateway Protocol (BGP) message including a dynamic conditional advertisement community (DCAC) attribute configured to store the received block of network addresses, the indication that the multi-homed network is multi-homed and the aggregated route.

20. A computer-readable media storing instructions for execution on a processor for the practice of a method of implementing route aggregation in a computer network containing a multi-homed network connected to primary and secondary networks, the method comprising:
allocating a block of network addresses for the multi-homed network;
notifying the secondary network of the block of network addresses allocated for the multi-homed network;
determining, at the secondary network, whether the primary network has advertised an aggregated route including the multi-homed network's allocated block of network addresses; and
suppressing, at the secondary network, advertisements containing the multi-homed network's allocated block of network addresses in response to determining that the primary network has already advertised an aggregated route including the multi-homed network's allocated block of network addresses.

21. The computer-readable media of claim 20, wherein the method further comprises:

determining, at the secondary network, whether the primary network has lost network connectivity with a backbone network; and unsuppressing, at the secondary network, the advertisements containing the multi-homed network's allocated block of network addresses in response to determining that the primary network has lost network connectivity with the backbone network.

* * * * *

UNITED STATES PATENT AND TRADEMARK OFFICE
CERTIFICATE OF CORRECTION

PATENT NO. : 7,630,392 B2  Page 1 of 1
APPLICATION NO. : 11/141183
DATED : December 8, 2009
INVENTOR(S) : Syed Kalid Raza It is certified that error appears in the above-identified patent and that said Letters Patent is hereby corrected as shown below:

Col. 18, Line 39 Claim 18, please amend as shown:

route is advertised by the primary network, and to be unsuppressed in response to the aggregate route no longer being advertised by the primary network due to a loss of network connectivity with the primary network.

Col. 18, Line 59 Claim 20, please amend as shown:

work addresses;[[ and]]

Col. 18, Line 65, please amend as shown:

block of network addresses; determining, at the secondary network, whether the multi-homed network has lost network connectivity with the primary network; and unsuppressing, at the secondary network, the advertisements containing the multi-homed network's allocated block of network addresses in response to determining that the multi-homed network has lost network connectivity with the primary network.

Signed and Sealed this

Ninth Day of November, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,630,392 B2 | Page 1 of 1 |
| APPLICATION NO. | : 11/141183 | |
| DATED | : December 8, 2009 | |
| INVENTOR(S) | : Syed Khalid Raza | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1226 days.

Signed and Sealed this

Twenty-first Day of December, 2010

David J. Kappos
*Director of the United States Patent and Trademark Office*